(12) United States Patent
Samson

(10) Patent No.: US 6,253,979 B1
(45) Date of Patent: Jul. 3, 2001

(54) SUSPENSION BICYCLE BAG

(76) Inventor: S. Lee Samson, 20350 Otero Ave., Hastings, MN (US) 55033

(*) Notice: Subject to any disclaimer, the term of this patent is extended or adjusted under 35 U.S.C. 154(b) by 0 days.

(21) Appl. No.: 09/362,971

(22) Filed: Jul. 29, 1999

(51) Int. Cl.[7] .................................................. B62J 7/00
(52) U.S. Cl. ........................ 224/426; 224/437; 224/439; 224/463; 280/202; 411/500
(58) Field of Search ................................. 224/429, 426, 224/439, 463, 30 R, 437; 411/500; 493/186; 280/202

(56) References Cited

U.S. PATENT DOCUMENTS

| | | | |
|---|---|---|---|
| D. 258,731 | 3/1981 | Fleischman et al. | D12/158 |
| D. 271,758 | 12/1983 | Ervin | D12/158 |
| D. 274,900 | 7/1984 | Canter | D12/158 |
| D. 276,907 | 12/1984 | Royce | D12/158 |
| D. 331,557 | 12/1992 | Hurt | D12/158 |
| D. 366,446 | 1/1996 | Berman | D12/409 |
| D. 366,447 | 1/1996 | Berman | D12/409 |
| D. 367,034 | 2/1996 | Berman | D12/409 |
| 522,186 * | 7/1894 | Andrews | 224/439 |
| 567,162 * | 9/1896 | Le Grand Piece | 280/202 |
| 590,936 * | 9/1897 | Perkins | 224/439 |
| 618,612 * | 1/1899 | Parsons | 224/437 |
| 1,121,366 * | 12/1914 | Hurrell | 224/429 |
| 1,362,162 * | 12/1920 | Bradley | 224/429 |
| 1,400,967 * | 12/1921 | Merkel | 180/219 |
| 3,837,546 | 9/1974 | Westermann | 224/35 |
| 3,970,229 | 7/1976 | Norinsky | 224/31 |
| 4,368,897 | 1/1983 | Brown | 280/202 |
| 4,720,027 | 1/1988 | Board | 224/35 |
| 4,793,029 * | 12/1988 | Burke | 24/113 |
| 5,031,807 | 7/1991 | Tiffany | 224/35 |
| 5,071,046 | 12/1991 | Miller | 224/151 |
| 5,110,020 | 5/1992 | Uhl | 224/32 |
| 5,249,721 | 10/1993 | Brooks | 224/35 |
| 5,331,722 * | 7/1994 | Allen et al. | 24/68 |
| 5,692,268 * | 12/1997 | Case | 24/16 PB |
| 5,788,134 * | 8/1998 | Matic, Jr. | 224/414 |
| 5,823,557 * | 10/1998 | Penza | 280/304.5 |
| 5,829,656 * | 11/1998 | Reitz et al. | 224/417 |

FOREIGN PATENT DOCUMENTS

3516897 * 11/1986 (DE).
2355708 * 1/1978 (FR).

OTHER PUBLICATIONS

Declaration of S. Lee Samson dated Dec. 21, 2000.

* cited by examiner

*Primary Examiner*—Stephen K. Cronin
(74) *Attorney, Agent, or Firm*—Kinney & Lange, P.A.

(57) ABSTRACT

A carrying device for mounting on a bicycle. The bicycle has a frame constructed of a plurality of frame members that define an open area. The device is comprised of a bag having opposing side walls and having a shape that permits the bag to be positioned within the open area. The device also comprises an elastic connector for connecting the bag to the frame members whereby the bag is suspendable in the open area.

21 Claims, 6 Drawing Sheets

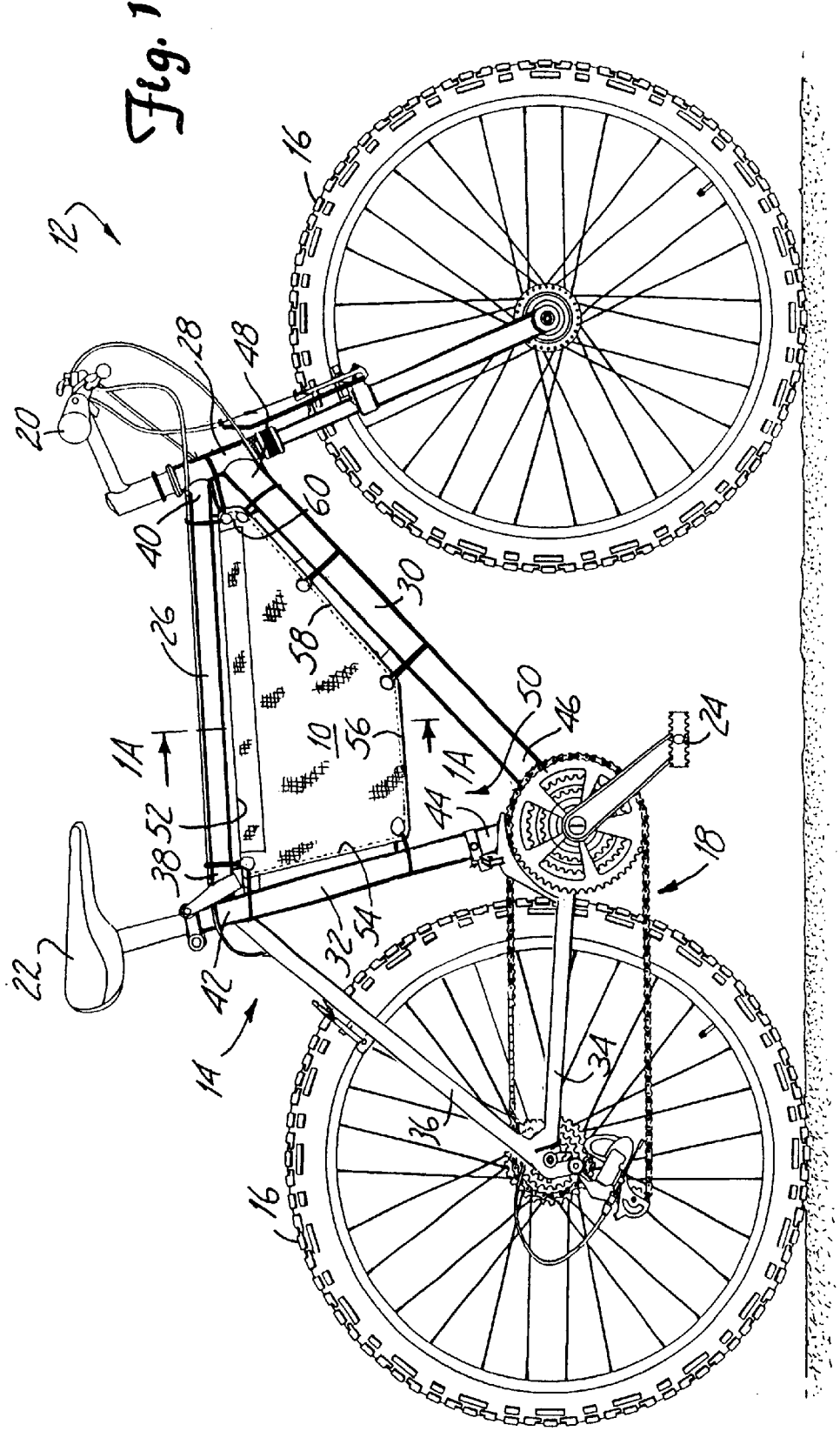

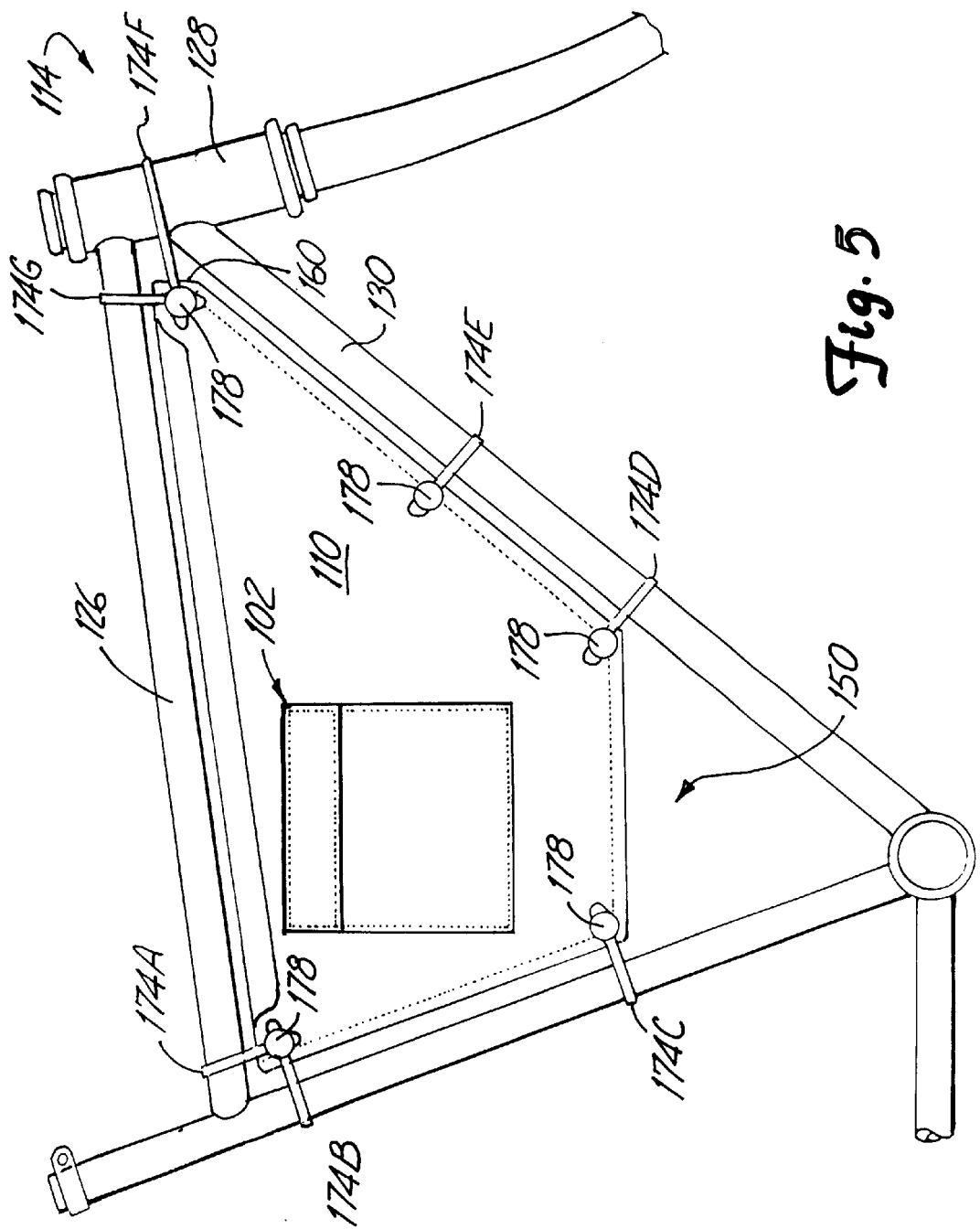

SUSPENSION BICYCLE BAG

BACKGROUND OF THE INVENTION

Recreational and sport bicycling has become a very popular pastime for all ages. Bicycling is a healthy, environmentally friendly and less costly alternative to driving a vehicle. A significant issue challenging bicycle use, however, is the bicycle's limited capability to carry anything beyond the rider. To address this issue, a number of under seat bags, handle bar bags, panniers (saddle bags), baskets, and small bags have been developed which mount to the bicycle. These items may be available either as part of the bicycle purchase or instead they may be purchased after market. This array of available bags is limited in carrying capacity, and often requires the use of tools and additional hardware to use. Also, after mounting, many of these bags cannot be easily removed from the bicycle.

One area of the bicycle which has not been adequately used for its storage capabilities is the available space between the top tube, the seat tube and the down tube of the bicycle frame. This area is at a low center of gravity on the bicycle, and items mounted here cause less problems with balancing and steering the bicycle. Although devices have been proposed to fill this area, the devices have not provided the flexibility to fit many sizes and styles of bicycles in combination with large storage capacity. The devices which fit many styles of bicycle frames have not efficiently used the total area provided. On the other hand, devices which provide a large amount of storage space have not been flexible enough in their design to fit different bicycle frame sizes.

Hard cases have been proposed which have a large amount of storage area, however, they cannot be easily adjusted to fit in different bicycle frame sizes. The use of hard cases also increases the chance that items inside the case may be damaged, since the items are loose and can slide around inside the case. These types of containers are usually expensive to fabricate because they require forming, welding or other expensive manufacturing operations. Additionally, a hard case design does not allow for changes in the shape of the device under the top tube. The inflexible design meant that the hard cases were more likely to interfere with the rider, even when the device was not being used.

Soft bags have also been proposed, however none has possessed a workable mounting system. Thus, the bags are limited in the sizes and types of frames into which they could fit. The bags are usually folded over the top tube and clipped, tied or fastened with hook and loop-type fasteners to the frame. Due to this mounting style, the bags have not maximized the use of the area under the top tube. Instead, large bags have been designed to fit a specific style of bike, filling a large amount of the space provided. Alternatively, bags have been made small to fit a large variety of bike styles. The use of prior carrying bags (as well as cases) has also limited the ability of the rider to use water bottles and air pumps mounted to the frame because of interference from the bag (or case).

BRIEF SUMMARY OF THE INVENTION

The present invention provides an alternative means for storing a variety of items while bicycling. A bag is suspended from the bicycle frame under the top tube of the bicycle. The use of a flexible suspension system provides the bag with the flexibility to carry a wide range of goods and equipment. The bag may be able to carry items as diverse in size as a wallet to a football with no hindrance to the rider. Additionally, the suspension system easily adjusts to a variety of frame sizes, and does not prevent the use of other frame mounted attachments. The present invention is easily attached and removed from the bicycle.

BRIEF DESCRIPTION OF THE DRAWINGS

FIG. 1 shows a side view of a bicycle frame with an embodiment of the invention attached.

FIG. 5 shows a side view of a bicycle frame in an alternate embodiment of the invention.

DETAILED DESCRIPTION

Figure 1A:
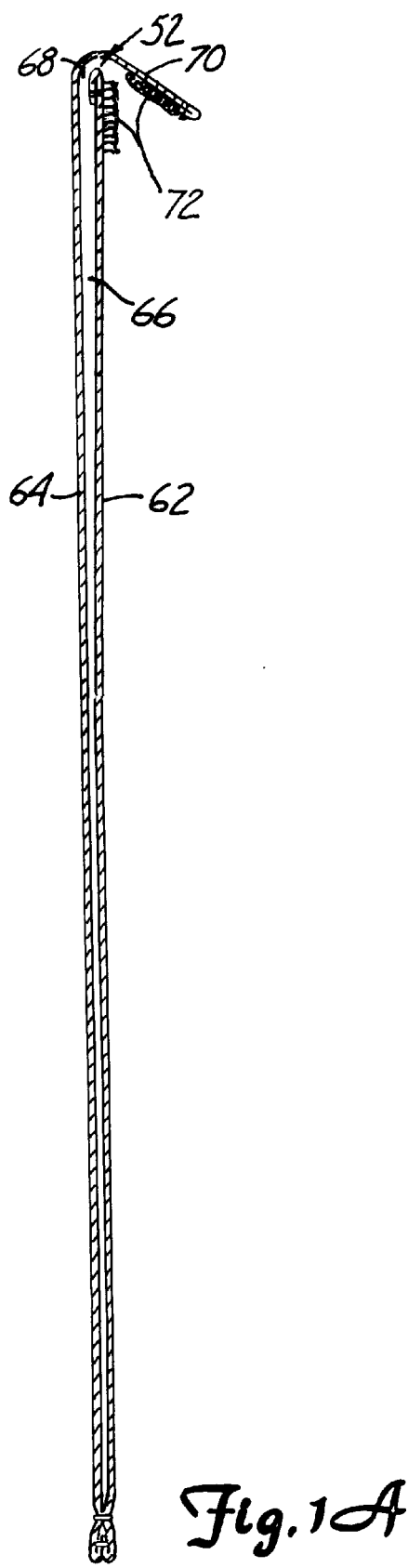
FIG. 1A shows a cross-sectional view of an embodiment of the invention taken along line 1A in FIG. 1.

The present invention includes a bicycle bag generally indicated at 10 in FIG. 1. The bicycle bag 10 is removably attachable to a bicycle 12 or any other like object. The bicycle 12 includes a frame 14, wheels 16, a drive system 18, handlebars 20, a seat 22 and peddles 24. The bag 10 is attached to the frame 14 of the bicycle 12. The configuration of the bicycle 12 in this embodiment is of a road bike design, however, the invention can be used on any number of bicycle frame types, including a mountain bike.

The frame 14 of the bicycle 12 includes a top tube 26, a head tube 28, a down tube 30, a seat tube 32, a chain stay 34 and a seat stay 36. The top tube 26 is disposed in a generally horizontal manner, and includes a rearward seat end 38 and a forward head end 40. The seat end 38 is joined to the seat tube 32 proximate to a top end 42 of the seat tube 32. The seat tube 32 is disposed in a substantially vertical manner, with the top end 42 of the seat tube 32 disposed above a bottom end 44 of the seat tube 32. The bottom end 44 of the seat tube 32 is joined with a lower end 46 of the down tube 30. An upper end 48 of the down tube 30 is joined to the head tube 28. The down tube 30 is disposed diagonally, running upwardly and forwardly from the seat tube 32 to the head tube 28. The head tube 28 runs in a substantially vertical fashion. The head end 40 of the top tube 26 is joined to the head tube 28 proximate to where the down tube 30 is joined to the head tube 28. The point where the top tube 26 and the down tube 30 join the head tube 28 is proximate to the upward end of the head tube 28. A middle area 50 is framed by the top tube 26, the head tube 28, the down tube 30, and the seat tube 32 substantially forming the shape of a triangle. Those skilled in the art will recognize that the actual shape of the bicycle frame and the shape of the middle area 50 will depend upon the manufacturer of the frame. Also, the seat stay 36 and the chain stay 34 may or may not be included on the bicycle 12. Additional tubes may be included as part of the frame. Thus, it is to be noted that the frame 14 in FIG. 1 is merely for illustration purposes.

The bicycle bag 10 is mounted on the bicycle frame 14 so as to be disposed in the middle area 50. The bag 10 includes a top edge 52, a rear edge 54, a bottom edge 56, a lower edge 58 and a front edge 60. When the bag 10 is mounted, the top edge 52 extends in a substantially horizontal manner parallel to the top tube 26. The rear edge 54 extends substantially downwardly, parallel to the seat tube 32. The rear edge 54 extends from the top edge 52 to the bottom edge 56. The bottom edge 56 extends preferably parallel to the top edge 52 and is disposed proximate to the juncture of the seat tube 32 and the down tube 30. The bottom edge 56 extends from the rear edge 54 to the lower edge 58. The lower edge 58 extends upwardly and forwardly parallel to the down tube 30. The lower edge 58 runs from the bottom edge 56 to the front edge 60. The front edge 60 extends upwardly, parallel to the substantially vertical head tube 28. Thus, this configuration of the bag 10 substantially conforms with the middle area 50 dictated by the tubes of the bike frame 14.

The bicycle bag 10 is constructed from a flexible material such as canvas, denim, nylon or polyester that is able to withstand the outside environment. Any flexible and durable material may be used and the bag 10 may additionally be constructed of webbing or netting. Since the bag 10 uses flexible light-weight materials, the weight of the bag 10 is minimized. This can be very important to a bicyclist, since more weight requires more effort by the rider to pedal the bicycle. Additionally, weight can affect the balance and steerability of the bicycle. The bag material can be made of any color and also may include safety devices, for example reflective strips, active lighting methods, whistles, and the like.

The bag 10 includes a first sidewall 62 and a second sidewall 64 as illustrated in FIG. IA. Each sidewall 62 and 64 is defined by the top edge 52, rear edge 54, bottom edge 56, lower edge 58 and front edge 60 of the bag 10 as illustrated in FIG. 1. The sidewalls 62 and 64 are stitched together at the rear edge 54, bottom edge 56, lower edge 58 and front edge 60 of the bag 10. The sidewalls 62 and 64 define an interior chamber 66 of the bag 10. At the top edge 52 of the bag 10, the two sidewalls 62 and 64 are left at least partially unattached to each other to create an opening 68 to the interior chamber 66. The top edge 52 of the bag 10, may be stitched partially closed, as long as the opening 68 is large enough to allow the rider access to the interior chamber 66 of the bag 10. Although stitching is described to construct the bag 10, any method which sealably engages the first sidewall 62 to the second sidewall 64 may be utilized. This may include such methods as heat sealing, stapling, gluing, and ultrasonic welding.

A closing flap 70 is preferably included as part of the bag 10. The flap 70 is attached to the second sidewall 64 (although those skilled in the art will recognize that it may be attached to either of the sidewalls 62 and 64). The flap 70 is a piece of bag material which folds over the top edge 52 of the bag 10, covering the opening 68 of the bag 10. The closing flap 70 prevents unwanted debris and water from entering the bag 10, as well as securing the bag 10 contents. The flap 70 may be a separate piece of material stitched to the second sidewall 64 or alternatively may be part of the second sidewall 64 itself, made to extend above and fold over the first sidewall 62. The flap can have a securing mechanism 72 which allows the rider to removably fasten the closing flap 70 to the first sidewall 62. Examples of fastening methods include hook and loop-type fasteners, magnets, and snaps, although any type of fastener can be used.

Figure 2:
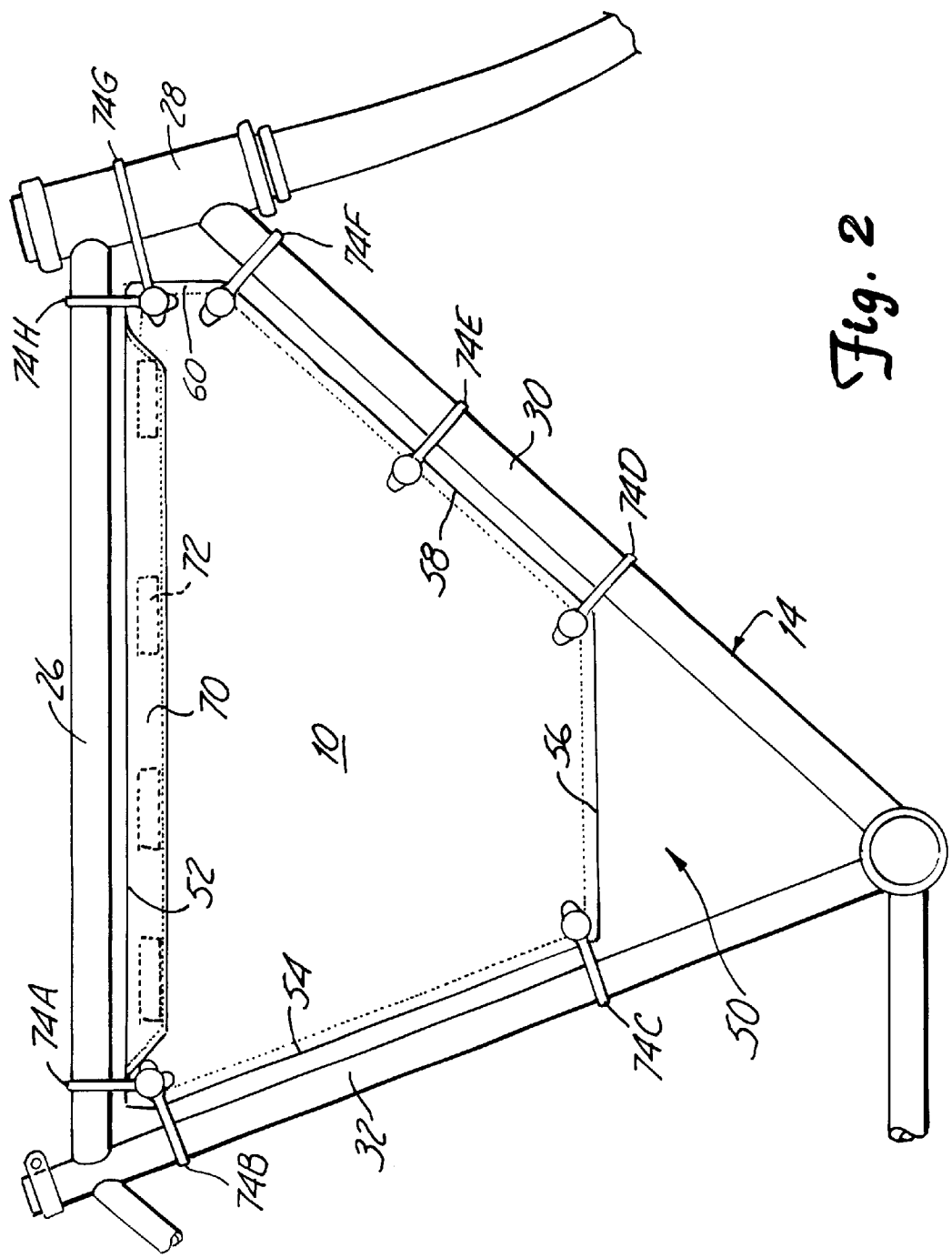
FIG. 2 shows a side view of a bicycle frame with an embodiment of the invention attached

The bag 10 is preferably mounted to the frame 14 using eight elastic connectors 74A–74H as illustrated in FIG. 2 although it is understood that more or less connectors may be used. In this embodiment, the connectors 74A–74H are elastomer straps, however, any type of elastic connector, including shock cords, may be used. The connectors 74A–74H are attached to the first sidewall 62 of the bag 10, extend around the tubes of the frame 14 and are attached to the second sidewall 64 of the bag 10.

Two elastic connectors 74A and 74B are attached to the rear upper corner of the bag 10 where the top edge 52 meets the rear edge 54. The elastic connector 74A extends perpendicularly around the top tube 26. The other elastic connector 74B extends laterally around the seat tube 32. Another elastic connector 74C is attached in the lower rear corner of the bag 10, where the rear edge 54 meets the bottom edge 56. The elastic connector 74C extends laterally around the seat tube 32. Three elastic connectors 74D, 74E and 74F are attached to the bag 10 along the lower edge 58. Elastic connector 74D is attached to the lower forward corner of the bag 10 where the bottom edge 56 meets the lower edge 58, and extends diagonally around the down tube 30. Elastic connector 74F is attached to the corner of the bag 10 where the lower edge 58 meets the front edge 60, and extends diagonally around the down tube 30. Elastic connector 74E is attached midway along the lower edge 58 of the bag 10 and extends diagonally around the down tube 30. Similar to the rear upper corner, the forward upper corner, located where the top edge 52 meets the front edge 60, has two elastic connectors 74G and 74H attached. One elastic connector 74H extends perpendicularly around the top tube 26. The other elastic connector 74G extends laterally around the head tube 28. Attaching the elastic connectors 74A–74H in this fashion creates a suspension system, comprised of all the elastic connectors 74A–74H.

The suspension system not only maintains support between the frame 14 and the carrier bag 10 but also maintains elasticity in the support. One result of using the mounting method of this invention is that variations in frame size do not affect the ability of the user to mount the carrier bag 10. To mount the bag 10 on a large frame, the user stretches the elastic connectors 74A–74H more than he or she would be required to do with a smaller frame. Additionally, manufacturing the frame using a variety of tube angles does not affect the ability of the bag 10 to be mounted in the middle area 50. For example, if the seat tube 32 of a bicycle made by a first manufacturer is at an angle which causes the seat tube 32 to have a larger horizontal run than the seat tube 32 made by a second manufacturer, the suspension system is able to stretch to accommodate. The elastic connecter 74B which attaches the bicycle bag 10 proximate to the top end 42 of the seat tube 32 will be stretched more for the first manufacturer's frame than it will for the second manufacturer's frame. Conversely, the elastic connector 74C which attaches the bag 10 proximate to the bottom end 44 of the seat tube 32 will be stretched more for the second manufacturer's frame than for the first manufacturer's frame. The same is true for frame tube diameter variations.

The suspension system also allows the carrier bag 10 to be mounted to the frame 14 so as not to affect the functionality of other biking apparatus mounted to the frame 14. For example, a pump and/or a water bottle (not shown) is often mounted inside the middle area 50. These apparatus can be mounted to the top tube 26, the down tube 30 or the seat tube 32. By mounting the carrier bag 10 using elastic connectors 74A–74H, the bag 10 can be suspended farther away from the frame 14 to allow room for the pump and water bottle (not shown). Additionally, the rider may pull the bag out of the way to allow better access to the pump or water bottle (not shown). The elastic connectors 74A–74H stretch to allow the bag 10 to be moved away from one part of the frame 14. The rider then accesses the pump or water bottle (not shown), and the elastic connector 74A–74H will return the bag 10 to its original position.

The utilizing of the flexible material in combination with the suspension system gives the bag 10 the additional advantage of accommodating different sizes and shapes of objects placed into the interior chamber 66 and securing those items in place. Items are placed inside the bag 10, which stretches the sides of the bag 10 perpendicular to the spatial plane defined by the frame 14. Stretching or "bowing" the sides of the bag 10 in this fashion results in the bag 10 pulling away from the frame 14. This "bowing" requires elasticity in the connections from the frame 14 to the bag 10. For example, if an item the size of a football is placed in the frame 14, the sides of the bag 10 will bow out, pulling the bag 10 away from the seat tube 32, the down tube 30 and the head tube 28. The suspension system allows the bag 10 to pull away from the frame 14, by stretching the elastic connectors 74A–74H. If the suspension system were not present, the bag 10 would not be able to change its shape, and less items could be accommodated. Once the item is removed, the elastic connectors 74A–74H return the bag to its original shape. Additionally, if a smaller item, the size of a wallet is placed in the bag 10, the suspension system continues to pull the edges of the bag 10 towards the frame 14, which tightens the sides of the bag 10 around the wallet. The elasticity of the system thereby prevents items from sliding around inside the bag 10, reducing the likelihood that spills or breakage will occur. The suspension system also performs a shock absorbing function. If any fragile items are placed in the bag 10, the elastic connectors 74A–74H provide a cushion to the jarring motion that is generated by the bike as it is ridden over rough terrain.

Figure 3:
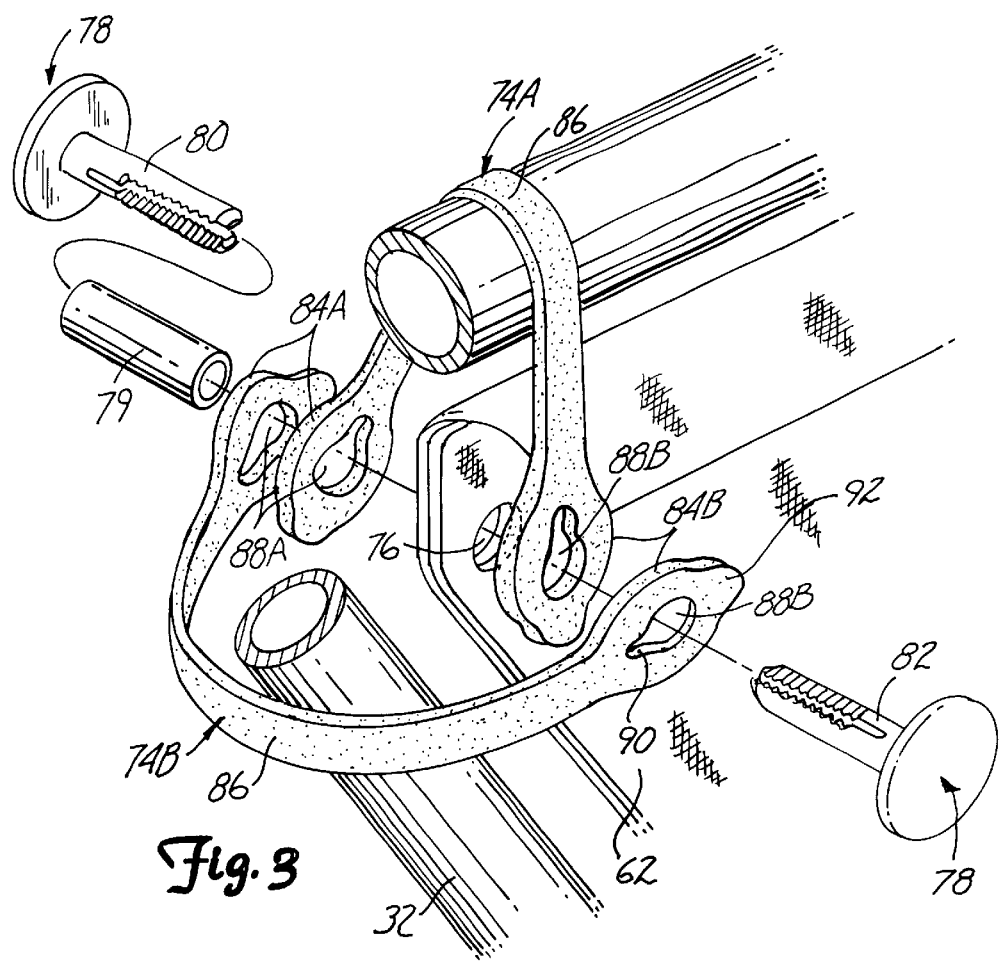
FIG. 3 shows an elevational view of the attachment straps as part of the preferred embodiment of the invention.

The elastic connectors 74A–74H are mounted to the bag 10 through the use of a mounting system which includes apertures 76, barbed rivets 78 and precision washers 79A and 79B illustrated in FIG. 3. The barbed rivets 78 include two main pieces, and are commonly known to those skilled in the art. The barbed rivets 78 include a first section 80 and a second section 82. Both the first section 80 and the second section 82 include a shaft and a head. In the current embodiment, the bag 10 includes six apertures 76. The apertures 76 extend directly through the first and second sidewalls 62 and 64 and are large enough to accommodate the passage of the shaft of the barbed rivet 78 but not the heads of the barbed rivet 78. Although any barbed rivet 78 size may be used, the current embodiment uses barbed rivets 78 that have a head size of approximately 0.750 inches and a shaft length of approximately 0.488 inches. The shafts for both the first and second sections 80 and 82 are serrated and the head is on one end of each shaft. Each shaft is formed so as to resemble two opposing quartiles of a circular shaft. The inside of the quartiles are serrated. When the shafts for the first and second sections 80 and 82 are mated, the serrations on the shaft of the first section 80 interlock with the shaft of the second section 82. The result is the two quartiles of the first section 80 and the two quartiles from the second section 82 mate to form a substantially circular single shaft. Note that although barbed rivets 78 are shown in the preferred embodiment a person skilled in the art will recognize that fasteners may be used, including buttons and threaded links.

Each elastic connector 74A and 74B includes two annuluses 84A and 84B and a stem 86. The first annulus 84A is linked with the second annulus 84B by the stem 86. The connectors 74 in this embodiment are manufactured using a unitary piece of elastic material. Here, an elastomeric terpolymer of Ethylene Propylene Diene Monomers (EPDM) is used, although any weather resistant elastic material is acceptable. Openings 88A and 88B extend through the center of each annulus 84A and 84B. The openings 88A and 88B have diameters large enough to receive the shaft of the barbed rivet 78, while preventing the passage of the head of the barbed rivet 78. The openings 88A and 88B are in communication with an adjacent notch 90 located proximate to where the annulus 84 meets the stem 86. Each annulus 84A and 84B also includes a pull tab 92. The pull tab 92 extends from each annulus 84A–84B of the elastic connectors 74A–74H. The connectors 74A–74H extend approximately 5.25 inches between the centerpoints of the openings 88A and 88B. Each of the openings 88A and 88B has a radius of approximately 0.375 inches and each notch 90A and 90B has a radius of approximately 0.125 inches. Each opening 88A and 88B is approximately 0.875 inches long including the notch 90. Each connector 74A–74H is approximately 0.125 inches thick and the width of the stem 86 is approximately 0.225 inches. The radius of each annulus 84 is approximately 0.6 inches. Although dimensions for the preferred embodiment have been indicated, these measurements may vary according to various embodiments of the elastic connector 74.

The precision washers 79A and 79B are used to provide a tight fit for the mounting system, and to prevent the barbed rivets 78 from sliding in the aperture 76. Preventing sliding is accomplished by making the outside diameter of the washers 79A and 79B larger than the diameter of the aperture 76. The inside diameter of the washers 79A and 79B is large enough to allow the shaft of the barbed rivet 78 to pass through, while small enough to prevent the passage of the head of the barbed rivet 78. Using the precision washers 79A and 79B in this manner effectively "locks" the barbed rivet 78 in place with respect to the bag 10. The preferred embodiment of the invention uses precision washers 79A and 79B with an outside diameter of approximately .335 inches and an inside diameter of approximately 0.280 inches. The thickness of the washer is approximately 0.195 inches. Although two precision washers 79A and 79B are illustrated in FIG. 3, this is by no means necessary. A person skilled in the art would realize one washer or no washer at all need be used as part of the mounting system. Using washers 79A and 79B has the effect of stabilizing the barbed rivet 78 so the elastic connectors 74 can be easily connected and disconnected from the bag 10. The washers 79A and 79B maintain the head of the barbed rivet 78 a selected distance from the bag 10.

To assemble the present invention the shaft of the first section 80 is extended shaft first through the precision washer 79A and next through the opening 88A in the annulus 84A of the elastic connectors 74A and 74B. (Note that not all mounting points on the bag 10 have multiple connectors 74A–74H, as illustrated in FIG. 2). The shaft of the first section 80 is then extended through the aperture 76 in the bag 10. Both the outside diameter of the shaft of the barbed rivet 78 and the outside diameter of the precision washers 79A and 79B are smaller than the diameter of the openings 88A and 88B. The head of the first section 80 is larger than the diameter of both the aperture 76 in the bag 10, and the opening 88A in the first annulus 84A of elastic connector 74A–74H. Thus, the barbed rivet 78 cannot be pushed completely through the aperture 76 and each elastic connector 74A–74H is effectively held between the side of the bag 10 and the head of the barbed rivet 78. The elastic connectors 74A and 74B are extended perpendicularly around the top tube 26 and horizontally around the seat tube 32, respectively. Finally, the shaft of the second section 82 extends through the precision washer 79B and then through the opening 88B in the second annulus 84B of the elastic connectors 74A–74H. The second section 82 is then mated with the first section 80. When mated, the serrations on the first section 80 interlock with the serrations on the second section 82, securing the two halves of the barbed rivet 78 together. Each barbed rivet 78 is able to accommodate the connection of at least one elastic connector 74A–74H. In the preferred embodiment, multiple elastic connectors 74A, 74B, are used for the mounting point located in the upper front corner of the bag 10 and multiple elastic connectors 74G and 74H are used for the mounting point in the rear corner of the bag 10. However, a person skilled in the art will realize that multiple connectors may be used at other mounting points on the bag 10.

The mounting system allows the bag 10 to be attached and unattached from the bike 12 without removing the barbed rivets 78 from the apertures 76. Each elastic connector 74A–74H is simply stretched so that the opening 88A or 88B is elongated. The rider can then slide the head of the barbed rivet 78 through the opening 88A or 88B in the same manner that a button on a shirt is undone. The pull tab 92, is provided to give the rider a better grip on the elastic connectors 74A–74H, facilitating the attachment or unattachment of the connector 74A–74H to the barbed rivet 78. The bag 10 is installed by extending all of the elastic connectors 74A–74H around the frame 14 and attaching them to the barbed rivets 78. Removing one end of all of the elastic connectors 74A–74H from the barbed rivet 78 unattaches the bag 10 from the frame 14 of the bike 12.

Figure 4A:
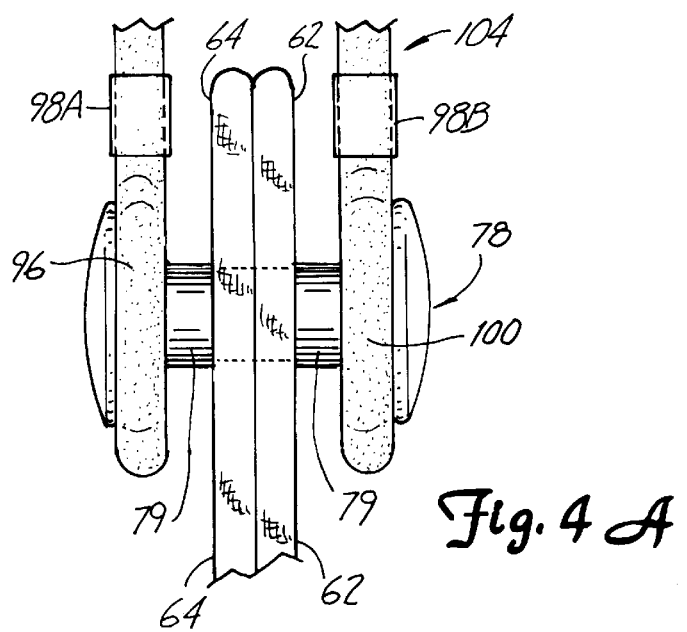
FIG. 4A shows an alternate embodiment of the mounting system.
Figure 4B:
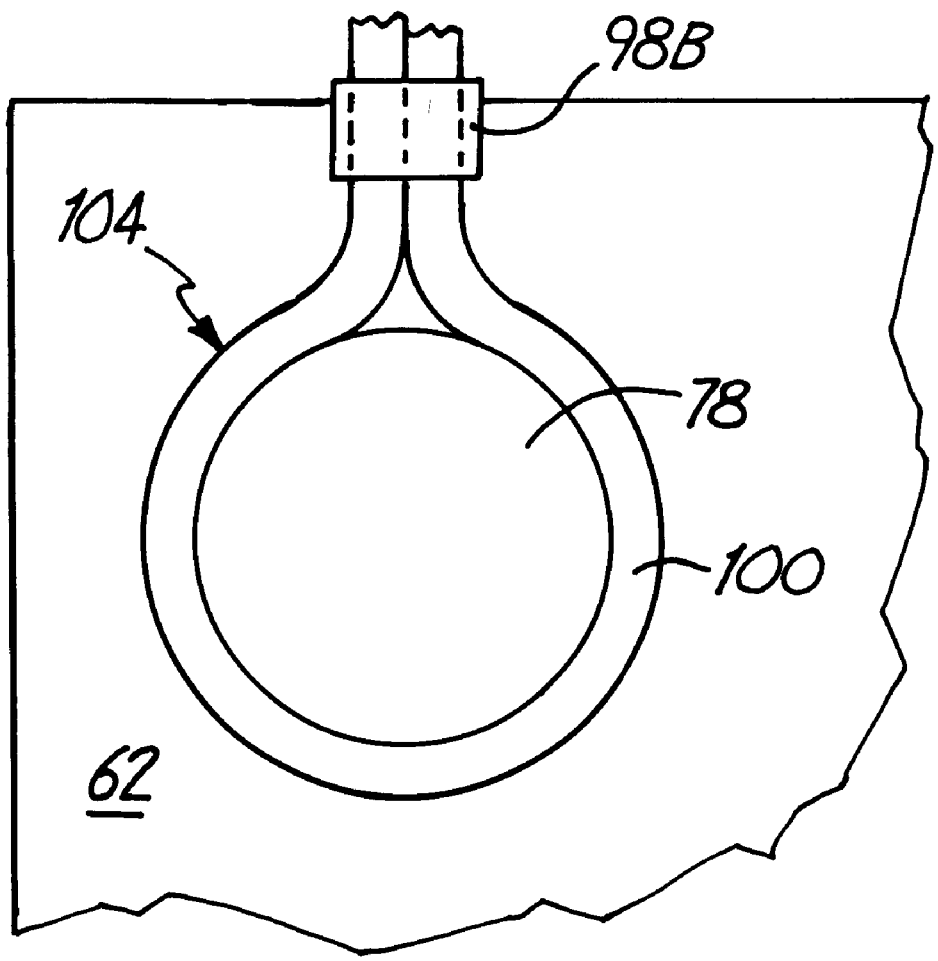
FIG. 4B shows a side view of the mounting system shown in FIG. 4A.

Shock cords are an example of one alternative which may be used in place of the EPDM straps described with respect to FIG. 3. The use of shock cords as the elastic connectors 74A–74H in the mounting system is illustrated in FIGS. 4A and 4B. A first end 96 of a shock cord connector 104 is formed into a loop and the loop is secured using clip 98A. A second end 100 of the shock cord connector 104 is formed into a loop and the loop is secured using clip 98B. The shock cord connector 104 is then fastened to the bag 10 using barbed rivet 78 in the manner described with respect to FIG. 3. The shock cord connector 104 can be removed from the barbed rivet 78 in the same fashion as the elastomeric (EPDM) straps. The shock cord connector 104 is stretched so as to elongate the loop end 96 and 100 of the shock cord connector 104. The rider can slide the loop of shock cord over the head of the barbed rivet 78 for installation. Unattaching one end of the shock cord connectors 104 in this same manner, allows the bag 10 to be removed from the frame 14 of the bicycle 12.

An alternate embodiment of the inventive bicycle bag 110 is shown in FIG. 5. In this embodiment, the bag 110 is mounted on a mountain bike. The bag 110 is mounted using elastic connectors 174A through 174G to create the suspension system. In this embodiment, five barbed rivets 178 are used in the mounting system for the bike bag 110. The frame 114 of the mountain bike is constructed such that the top tube 126 is disposed more on an incline than the tube on the road bike frame 14 (illustrated in FIG. 2). Additionally, the top tube 126 joins the head tube 128 more proximate to where the down tube 130 joins the head tube 128. Consequently, the front edge 160 of the bag 110 must be shorter than the embodiment described with respect to FIGS. 1 and 2. The shorter front edge 160 fits the middle area 150 defined by the tubes of the frame 114 in a more efficient manner, maximizing the space available. Since the front edge 160 is shortened, only one mounting point is required to hold the bag 110 to the frame 114 at the upper forward corner of the bag 110.

The embodiment in FIG. 5 also illustrates an optional feature which may be used on any version of the invention. One or more pockets 102 may be attached to the bag 110, allowing the rider to maximize the area used in the middle area 150. The pocket 102 increases the carrying capacity of the bag 110 and allows the rider to keep items separate. For example, the side pocket 102 can be used to transport keys, money, or other items which the rider may need access to on a frequent basis. This allows the rider to use the interior chamber of the bag 110 for larger items such as books or sporting equipment that he or she does not need as often.

Utilizing a flexible bag combined with an elastic suspension system provides the most efficient way to carry items on a bicycle in the space below the top tube. The combination allows the bag to be mounted on multiple styles and sizes of frames while maximizing the space afforded under the top tube of the bicycle.

Although the present invention has been described with reference to preferred embodiments, workers skilled in the art will recognize that changes may be made in form and detail without departing from the spirit and scope of the invention.

What is claimed is:

1. A carrying device for mounting on a bicycle comprising:
    a flexible bag having a first side wall, and a second opposing side wall, a top edge, a lower edge, and a rear edge;
    a plurality of elongate elastic connectors, each connector having a first end attached to the first sidewall, and a second end attached to the second sidewall, wherein at least one elastic connector is disposed proximate the top edge so as to be positionable about a top tube of the bicycle, at least one elastic connector is disposed proximate the rear edge so as to be positionable about a seat tube of the bicycle and at least one elastic connector is disposed proximate the lower edge so as to be positionable about a down tube of the bicycle; and
    wherein the elastic connectors bias the first sidewall toward the second sidewall when the carrying device is mounted on the bicycle.

2. The device of claim 1 wherein each elastic connector is securable to the flexible bag through a mounting system, the mounting system comprised of:
    a barbed rivet, the barbed rivet extending through an aperture in the bag; and
    at least one precision washer disposed over the barbed rivet.

3. The device of claim 1 wherein the flexible bag is polyester, denim, nylon or canvas.

4. The device of claim 1 wherein the flexible bag is webbing or netting.

5. The device of claim 1 wherein each elastic connector is made of an elastic terpolymer.

6. The device of claim 1 wherein each elastic connector is a shock cord.

7. The device of claim 1 wherein at least one pocket is affixed to the bag.

8. The device of claim 1 additionally comprising:
    a flap affixed to the second sidewall so as to fold over an opening in the bag; and
    wherein the flap is releasably engageable with the first sidewall.

9. The device of claim 1 wherein when the flexible bag is mounted to the bicycle, the flexible bag is positionable so that the top edge is disposed substantially parallel to the top tube, while the rear edge is positionable substantially parallel to the seat tube and while the lower edge is positionable substantially parallel to the down tube.

10. The device of claim 1 wherein when the flexible bag is mounted to the bicycle, inserting objects into the flexible bag overcomes the bias provided by the elastic connectors and moves the first sidewall and the second sidewall apart.

11. The device of claim 1 wherein the flexible bag further comprises:
   a bottom edge extending between the lower edge and the rear edge;
   a front edge extending between the lower edge and the top edge; and
   wherein the top edge extends between the front edge and the rear edge, the rear edge extends between the top edge and the bottom edge, and the lower edge extends between the bottom edge and the front edge.

12. The device of claim 11 wherein the plurality of elastic connectors include:
   a first elastic connector attached to the bag proximate to a corner of the bag formed by the top edge and the rear edge, so as to be extendable about the top tube when the device is mounted to the bicycle;
   a second elastic connector attached to the bag proximate to the corner of the bag formed by the top edge and the rear edge, so as to be extendable about the seat tube when the device is mounted to the bicycle;
   a third elastic connector attached to the bag proximate to a corner of the bag formed by the rear edge and the bottom edge, so as to be extendable about the seat tube when the device is mounted to the bicycle;
   a fourth elastic connector attached to the bag proximate to a corner of the bag formed by the bottom edge and the lower edge, so as to be extendable about the down tube when the device is mounted to the bicycle;
   a fifth elastic connector attached to the bag proximate to the lower edge about midway along the length of the lower edge so as to be extendable about the down tube when the device is mounted to the bicycle;
   a sixth elastic connector attached to the bag proximate to a corner of the bag formed by the top edge and the front edge, so as to be extendable about a front tube when the device is mounted to the bicycle;
   a seventh elastic connector attached to the bag proximate to the corner of the bag formed by the top edge and the front edge, so as to be extendable about the top tube when the device is mounted to the bicycle; and
   wherein when the device is mounted to the bicycle, the elastic connectors act to suspend the flexible bag between the top tube, the seat tube, the down tube and the front tube.

13. The device of claim 12 further comprising:
   an eighth elastic connector attached to the bag proximate to a corner of the bag formed by the lower edge and the front edge, so as to be extendable about the down tube when the device is mounted to the bicycle.

14. A method for mounting a flexible bag to a bicycle frame, the method comprising:
   attaching a top edge of the flexible bag to a top tube of the bicycle frame with a first elastic connector;
   attaching a rear edge of the bag to a seat tube of the bicycle frame with a second elastic connector
   attaching a lower edge of the bag to a down tube of the bicycle frame with a third elastic connector;
   tensioning the elastic connectors so as to pull the top edge towards the top tube, the rear edge towards the seat tube and the lower edge towards the down tube suspending the flexible bag between the top tube, the seat tube and the down tube; and
   biasing a first sidewall of the flexible bag towards a second sidewall of the flexible bag using the tensioned elastic connectors wherein objects inserted into the bag overcome the bias provided by the elastic connectors and move the first sidewall and second sidewall apart so as to secure each object between the first sidewall and the second sidewall.

15. The method of claim 14, wherein mounting the bag further comprises:
   extending barbed rivets through apertures in the flexible bag;
   removeably attaching a first end of each elastic connector to one of the barbed rivets;
   extending each elastic connector around the bicycle frame; and
   removeably attaching a second end of each elastic connector to the barbed rivet.

16. The method of claim 14 further comprising:
   affixing a pocket to the bag.

17. The method of claim 14 additionally comprising:
   attaching a flap to the second sidewall;
   extending the flap over an opening in the bag.

18. A mounted carrying system comprising:
   a bicycle having a generally horizontal top tube, a substantially vertical seat tube extending downwardly from a first end of the top tube, and a diagonal down tube extending from a second end of the top tube to the seat tube so as to define an open area below the top tube;
   a flexible bag disposed in the open area having a first sidewall, a second opposing sidewall, a top edge extending substantially parallel to the top tube, a rear edge extending substantially parallel to the seat tube, and a lower edge extending substantially parallel to the down tube; and
   a plurality of elongate elastic connectors, each connector having a first end attached to the first sidewall, and a second end attached to the second sidewall, wherein at least one elastic connector is attached to the first sidewall proximate the top edge and extended about a top tube of the bicycle, at least one elastic connector is attached to the first sidewall proximate the rear edge and extended about a seat tube of the bicycle and at least one connector is attached to the first sidewall proximate the lower edge and extended about a down tube of the bicycle.

19. The device of claim 18 wherein the elongate elastic connectors bias the first sidewall into contact with the second sidewall, wherein objects inserted into the flexible bag overcome the bias provided by the elastic connectors and move the first sidewall and the second sidewall apart so as to encase each object in the bag.

20. The device of claim 18 wherein the flexible bag further comprises:
   a bottom edge extending between the lower edge and the rear edge;
   a front edge extending between the lower edge and the top edge; and
   wherein the top edge extends between the front edge and the rear edge, the rear edge extends between the top edge and the bottom edge, and the lower edge extends between the bottom edge and the front edge.

21. The device of claim 20 wherein the elastic connectors include:
- a first elastic connector extended about the top tube and attached to the bag proximate to a corner of the bag formed by the top edge and the rear edge;
- a second elastic connector extended about the seat tube and attached to the bag proximate to the corner of the bag formed by the top edge and the rear edge;
- a third elastic connector extended about the seat tube and attached to the bag proximate to a corner of the bag formed by the rear edge and the bottom edge;
- a fourth elastic connector extended about the down tube and attached to the bag proximate to a corner of the bag formed by the bottom edge and the lower edge;
- a fifth elastic connector extended about the down tube and attached to the bag proximate to the lower edge about midway along the length of the lower edge;
- a sixth elastic connector extended about a front tube and attached to the bag proximate to a corner of the bag formed by the top edge and the front edge;
- an seventh elastic connector extended about the top tube and attached to the bag proximate to the corner of the bag formed by the top edge and the front edge; and
- wherein the elastic connectors suspend the flexible bag between the top tube, the seat tube, the down tube and the front tube.

* * * * *

UNITED STATES PATENT AND TRADEMARK OFFICE
CERTIFICATE OF CORRECTION

Page 1 of 1

PATENT NO.    : 6,253,979 B1
DATED         : July 3, 2001
INVENTOR(S)   : S. Lee Samson It is certified that error appears in the above-identified patent and that said Letters Patent is hereby corrected as shown below:

<u>Title page,</u>
References Cited, delete "Le Grand Piece", insert -- Le Grand Pierce --

Signed and Sealed this

Sixteenth Day of April, 2002

Attest:

JAMES E. ROGAN
*Attesting Officer*    *Director of the United States Patent and Trademark Office*